United States Patent
Canard et al.

(10) Patent No.: US 11,068,619 B2
(45) Date of Patent: Jul. 20, 2021

(54) METHOD AND DEVICE FOR ANONYMIZING DATA STORED IN A DATABASE

(71) Applicant: ORANGE, Issy-les-Moulineaux (FR)

(72) Inventors: Sebastien Canard, Caen (FR); Baptiste Olivier, Rennes (FR); Solenn Brunet, Paris (FR); Dominique Le Hello, Le Fresne Camilly (FR)

(73) Assignee: ORANGE

( * ) Notice: Subject to any disclaimer, the term of this patent is extended or adjusted under 35 U.S.C. 154(b) by 139 days.

(21) Appl. No.: 16/076,931

(22) PCT Filed: Feb. 7, 2017

(86) PCT No.: PCT/FR2017/050271
§ 371 (c)(1),
(2) Date: Aug. 9, 2018

(87) PCT Pub. No.: WO2017/137689
PCT Pub. Date: Aug. 17, 2017

(65) Prior Publication Data
US 2019/0050599 A1 Feb. 14, 2019

(30) Foreign Application Priority Data

Feb. 9, 2016 (FR) ...................................... 1651021

(51) Int. Cl.
*G06F 21/62* (2013.01)
*H04L 9/08* (2006.01)
*G06F 16/2455* (2019.01)
*G06F 16/901* (2019.01)
(Continued)

(52) U.S. Cl.
CPC .... *G06F 21/6254* (2013.01); *G06F 16/24554* (2019.01); *G06F 16/9024* (2019.01);
(Continued)

(58) Field of Classification Search
CPC ...... G06F 21/6254; G06F 17/18; G06F 17/16; G06F 21/602
(Continued)

(56) References Cited

U.S. PATENT DOCUMENTS 7,865,388 B2 * 1/2011 Brumbaugh .......... G06F 21/577
705/7.13
8,561,127 B1 * 10/2013 Agrawal ............... H04L 63/105
726/1
(Continued)

OTHER PUBLICATIONS

Canfora et al., "Tuning anonymity level for assuring high data quality: an empirical study", doi: 10.1109/ESEM.2007.23, 2007, pp. 91-98. (Year: 2007).*
(Continued)

*Primary Examiner* — Peter C Shaw
(74) *Attorney, Agent, or Firm* — David D. Brush; Westman, Champlin & Koehler, P.A.

(57) ABSTRACT

A method is provided to anonymize "initial" data stored in a database of a computer system and resulting from aggregating personal data relating to a plurality of individuals. The method includes: an identification act identifying in the initial data a set of data that is "sensitive" that would be affected by personal data relating to one individual being added to or removed from the database; a partitioning act partitioning the sensitive data set into a plurality of subsets as a function of a sensitivity level of the sensitive data; a determination act determining a sensitivity level for each subset; and an anonymization act anonymizing the initial data and including, for each subset, adding noise to the sensitive data of that subset with a noise level that depends on the sensitivity level determined for the subset.

15 Claims, 2 Drawing Sheets

(51) Int. Cl.
   *G06F 17/16* (2006.01)
   *G06F 17/18* (2006.01)
   *G06F 21/60* (2013.01)

(52) U.S. Cl.
   CPC .............. *G06F 17/16* (2013.01); *G06F 17/18* (2013.01); *G06F 21/602* (2013.01); *H04L 9/0861* (2013.01); *H04L 2209/046* (2013.01); *H04L 2209/42* (2013.01)

(58) Field of Classification Search
   USPC .......................................................... 726/26
   See application file for complete search history.

(56) References Cited

U.S. PATENT DOCUMENTS

| | | | | |
|---|---|---|---|---|
| 10,528,838 | B1* | 1/2020 | Carter, Jr. | G06T 19/006 |
| 2005/0152538 | A1* | 7/2005 | Stedron | H04L 9/065 |
| | | | | 380/28 |
| 2007/0195960 | A1* | 8/2007 | Goldman | H04L 9/30 |
| | | | | 380/286 |
| 2007/0273517 | A1* | 11/2007 | Govind | G16H 10/60 |
| | | | | 340/572.1 |
| 2013/0145473 | A1 | 6/2013 | Cormode et al. | |
| 2014/0058801 | A1* | 2/2014 | Deodhar | G06Q 10/0639 |
| | | | | 705/7.38 |
| 2015/0356411 | A1* | 12/2015 | Faith | G06N 20/00 |
| | | | | 706/46 |

OTHER PUBLICATIONS

Bhukya et al., "Implementing privacy mechanisms for data using anonymization algorithms", doi: 10.1109/ICEEOT.2016.7755137, 2016, pp. 2470-2476. (Year: 2016).*

Ghinita et al., "On the Anonymization of Sparse High-Dimensional Data", doi: 10.1109/ICDE.2008.4497480, 2008, pp. 715-724. (Year: 2008).*

Ghinita et al., "Anonymous Publication of Sensitive Transactional Data", doi: 10.1109/TKDE.2010.101, pp. 161-174, Feb. 2011. (Year: 2011).*

C. Dwork, F. McSherry, K. Nissim, and A. Smith entitled "Calibrating noise to sensitivity in private data analysis", Theory of Cryptography, pp. 265 284, 2006.

Shen-Shyang Ho et al. "Differential privacy for location pattern mining", Proceedings of the 4th ACM Sigspatial International Workshop on Security and Privacy in GIS and LBS, Springl '11. Jan. 1, 2011.

Cynthia Dwork et al. "Analyze gauss: Optimal bounds for privacy-preserving principal component analysis", Theory of Computing, ACM. May 31, 2014.

International Search Report dated Apr. 24, 2017, for corresponding International Application No. PCT/FR2017/050271, filed Feb. 7, 2017.

Written Opinion of the International Searching Authority dated Apr. 24, 2017, for corresponding International Application No. PCT/FR2017/050271, filed Feb. 7, 2017.

* cited by examiner

METHOD AND DEVICE FOR ANONYMIZING DATA STORED IN A DATABASE

CROSS-REFERENCE TO RELATED APPLICATIONS

This Application is a Section 371 National Stage Application of International Application No. PCT/FR2017/050271, Filed Feb. 7, 2017, the content of which is incorporated herein by reference in its entirety, and published as WO 2017/137689 on Aug. 17, 2017, not in English.

BACKGROUND OF THE INVENTION

The invention relates to the field of processing information.

More particularly, it relates to anonymizing "personal" data about individuals and stored in a database of a computer system (e.g. a server). The term "personal data" generally covers data about persons who may be identified directly or indirectly.

Personal data may be of various kinds, and may relate equally well to physical people or "individuals" and to "bodies corporate". By way of example, this data may be medical data, university data, data representing certain characteristics of individuals acquired on or by means of one or more communications networks, such as data concerning a social graph of individuals representing a network of connections and relationships of those individuals (commonly referred to as a "social network"), data extracted from reports of calls made in a telecommunications network (representative of individuals moving between various antenna sites of the network), browsing data of individuals on the public Internet (and in particular the sites they have visited and transitions from one site to another), data relating to the use made by individuals of various connected objects, etc. It can thus readily be understood that making data of this type public can invade the privacy of the individuals concerned. Unfortunately, with the present development of telecommunications networks and of ever more numerous services that rely on such networks (social networks, connected objects, etc.), we are now witnessing a spectacular increase in the amount of personal data that is exchanged via or over such networks.

At present, in the state of the art, there are various methods that exist for anonymizing (i.e. making anonymous) personal data stored in a database. In contrast to personal data, anonymous data of the kind that can be obtained by using such methods is data from which it is impossible:

(i) to target an individual;
(ii) to know whether the data is associated with one individual; and
(iii) to infer information about an individual.

Thus, anonymizing data consists in modifying the content or the structure of personal data so as to make it very difficult or even impossible to identify the individuals concerned from data that has been anonymized. This makes it possible for entities that possess personal data about individuals to make that data public (e.g. for data "mining" operations) without running the risk of revealing sensitive information about those individuals.

One known method of anonymization is specifically "differential privacy". Differential privacy makes it possible to anonymize data contained in a statistical database such as a graph or a matrix obtained by aggregating (for example by summing or by averaging) personal data relating to a plurality of individuals. This technique is particularly advantageous and valued because it makes it possible to quantify the level of anonymity that is achieved in a manner that is former and rigorous, in other words to quantify the risk of being able to re-identify personal data about the individuals in question from the resulting anonymous data (i.e. the data that has been "anonymized"). Advantageously, this makes it possible to monitor the compromise between the utility of the resulting anonymous data and of the level of anonymity that is guaranteed. Specifically, too high a level of anonymity may give rise to a loss of useful information about the original data. Conversely, an anonymous data set that it too close to the initial data set reveals too much information about the individuals concerned. Such monitoring is therefore important since it makes it possible to determine whether the level of anonymity under consideration is or is not reasonable.

Differential privacy has been studied abundantly and is described in detail in particular in the document by C. Dwork, F. McSherry, K. Nissim, and A. Smith entitled "Calibrating noise to sensitivity in private data analysis", Theory of Cryptography, pp. 265-284, 2006 (referred to below as "D1"). That technique of anonymization is also widely applied in contexts where the data being manipulated is represented in the form of graphs or matrices. In this context, one approach to differential privacy is described in the document by C. Dwork, K. Talwar, A. Thakurta, and L. Zhang entitled "Analyze Gauss: optimal bonds for privacy-preserving principal component analysis", STOC'14, May 31-Jun. 3, 2014 (referred to below as "D2"). This approach relies on creating a "synthetic" new graph (or a new matrix) that is statistically close to the initial graph (or matrix) that is to be anonymized, but that guarantees anonymity for the individuals involved.

A basic differential privacy algorithm consists in generating the new graph (or the new matrix) by adding noise to the "sensitive" data of the initial graph (or the initial matrix). The term "sensitive data" is used to mean the data of the graph or of the matrix that might potentially be affected by adding or removing data about one individual in the graph or the matrix. Sensitive data is made noisy by adding to the data Laplace random variables having the same predetermined standard deviation. In other words, the random variables used for adding noise to the data that is to be anonymized all have the same amplitude on average, which amplitude is equal to $\Delta/\varepsilon$, where $\Delta$ designates the sensitivity of the data and $\varepsilon$ is a parameter (i.e. a measure) that is representative of the level of privacy or anonymity that is ensured. The sensitivity $\Delta$ depends on the database under consideration. It measures the variations induced in the graphs or the matrices that are obtained from the database by adding or removing data about one individual.

That random differential privacy algorithm is said to be "$\varepsilon$-differentially private" ($\varepsilon$-DP). This means that two databases anonymized by that algorithm have almost the same probability law so long as the databases provided as input to the algorithm are close, i.e. differ by the contribution of one single individual. "Almost" is measured by the parameter $\varepsilon$: the smaller $\varepsilon$, the closer the probability law and the more difficult it is to detect the contribution of one particular individual in the databases (and thus the better the resulting anonymity), which corresponds to the target desired for differential privacy. It should be observed that the parameter E and the anonymity achieved by the algorithm vary in opposite directions, i.e. the smaller $\varepsilon$, the greater the anonymity guaranteed by the algorithm.

Nevertheless, and likewise, the smaller ε, the greater the departure of the anonymous database from the initial database: this therefore leads to a loss of useful information. Thus, as mentioned above, for any differential privacy algorithm, the quality of the anonymized data tends to be degraded with diminishing parameter ε (in other words with increasing the level of anonymity reached). Between two differential privacy algorithms leading to the same measure E representative of the level of anonymity that is reached, it is therefore preferable to use the algorithm that proposes anonymous data of better quality (i.e. an anonymous database that is closer to the initial matrix).

OBJECT AND SUMMARY OF THE INVENTION

The invention proposes a differential privacy algorithm that offers quality of the generated anonymous data that is improved compared with the approach used in the state of the art, while nevertheless guaranteeing a determined level of anonymity (or in equivalent manner a determined parameter ε).

More particularly, the invention provides an anonymization method for anonymizing "initial" data stored in a database of a computer system, the initial data resulting from aggregating personal data relating to a plurality of individuals, the anonymization method comprising:
- an identification step for identifying in the initial data a set of data that is "sensitive" that would be affected by personal data relating to one individual being added to or removed from the database;
- a partitioning step for partitioning the sensitive data set into a plurality of subsets as a function of a sensitivity level of the sensitive data;
- a determination step for determining a sensitivity level for each subset; and
- an anonymization step for anonymizing the initial data and comprising, for each subset, adding noise to the sensitive data of that subset with a noise level that depends on the sensitivity level determined for the subset.

Correspondingly, the invention also provides an anonymizer device for anonymizing "initial" data stored in a database, the initial data resulting from aggregating personal data relating to a plurality of individuals, the anonymizer device comprising:
- an identification module configured to identify in the initial data a set of "sensitive" data that would be affected by personal data relating to one individual being added to or removed from the database;
- a partitioning module configured to partition the sensitive data set into a plurality of subsets as a function of a sensitivity level of the sensitive data;
- a determination module configured to determine a sensitivity level for each subset; and
- an anonymizer module for anonymizing initial data that is configured to add noise to the sensitive data of each subset with a noise level that depends on the sensitivity level determined for that subset.

In other words, the invention proposes a differential privacy algorithm in which the level of anonymity can be quantified rigorously (by using the measure, i.e. the parameter, ε) and in which the initial data of the database has noise added thereto with a noise level that depends on the sensitivity level of the data. The invention relies specifically on the observation that for numerous data sets obtained in various contexts (social networks, networks of connected objects, mobile networks, etc.), some data is more sensitive than other data, i.e. it is possible to extract more information about any particular individual from the data that is more sensitive. More precisely, data in the database is considered to be "very sensitive" if that data of the database is likely to change considerably when data about one individual is added to or removed from the database. In contrast, data is considered as being relatively insensitive if the data in the database changes little when the contribution of one individual is added to or removed from the database. The sensitivity of a data value thus constitutes a kind of inherent anonymity level of that data value.

The noise added in the prior art (and in particular in the above-mentioned documents D1 and D2 by Dwork et al.) involves adding a level of noise in uniform manner over all of the sensitive data: under such circumstances, it can readily be understood that such uniform addition of noise can result in the destruction of information present in the lower amplitude data in the database. In contrast, the invention advantageously proposes adding noise, while also taking account of the sensitivity of the data so as to use noise that is calibrated accordingly. Thus, in the invention, data that is very sensitive (i.e. not very anonymous) preferably has larger amplitude noise added thereto, and vice versa. In other words, during the step of anonymizing the initial data, the level of noise applied to sensitive data in a subset preferably increases with increasing sensitivity level of that subset.

It should be observed that no limit is associated with the number of subsets to be taken into consideration while partitioning the entire set of sensitive data as a function of sensitivity level. Nevertheless, the inventors have observed that very good performance can be obtained while taking only two subsets into consideration.

Thus, by taking account of the sensitivity specific to the data to which noise is to be added, the invention adds granularity to the differential privacy algorithms described in the documents by Dwork et al. and makes it possible to improve the quality of the algorithm. Specifically, the synthetic database that is obtained by means of the invention is closer to the initial database (by advantageously adapting the noise added to the data as a function in particular of the anonymity inherent to the data). The statistics of the synthetic database (i.e. the anonymized database) thus correspond to statistics that are closer to reality (i.e. to the statistics of the initial database), while nevertheless having the same level of anonymity.

It may also be observed that unlike the invention, the differential privacy algorithm described in document D2 by Dwork et al. serves to generate matrices or graphs that are symmetrical only. The invention is not limited to that particular utilization, which can be found to be constraining.

Furthermore, the invention is not restricted to obtaining one particular structure for anonymized data (in particular a graph or a matrix complying with a particular model). In this respect it differs from certain prior art anonymizing techniques that rely on random generation of synthetic graphs on the basis of well-selected anonymous statistics. However, such random generation can lead to graphs having a particular structure, such as for example a Kronecker model or an exponential model, which can be found to be restrictive. It should also be observed that the invention is particularly advantageous compared with such techniques in that it gives very good results when the initial data forms a graph with low connectivity (which covers a large number of present-day situations in which it is desired to anonymize personal data), whereas with such a graph techniques that rely on random graph generation on the basis of anonymous statistics are not applicable.

The anonymization method proposed by the invention is also very flexible. The invention proposes a notion of anonymity that is very general, making it possible to select freely the desired type and the level of anonymity (by allowing one individual to have a greater or smaller influence on the data in the database), and the quality of the resulting synthetic and anonymous database depends on the desired type and level of anonymity. Thus, by way of illustration, when it is desired to anonymize data aggregated from mobility traces of individuals in a telecommunications network (where these mobile traces may for example be representative of paths followed by individuals between the various antenna sites of the network), it is possible to envisage the following two types of anonymity:
- anonymity relative to all of the paths followed by each individual;
- anonymity relative to the path followed most often by each individual.

The first type of anonymity is stronger, since more can be learnt about an individual by having knowledge about all of that individual's paths, however it is also more difficult to guarantee. The invention may advantageously be applied to any desired type of anonymity (the two types specified above and others), unlike numerous methods in the state of the art, which concentrate solely on the second above-specified type of anonymity.

In a particular embodiment, adding noise to the sensitive data of at least one subset indexed by $i$ comprises adding to that sensitive data noise having a Laplace distribution with a standard deviation $\sigma_i$ that is defined from the sensitivity level $\Delta_i$ determined for the subset and from a measure $\varepsilon$ of an anonymity level of the anonymization of the initial data.

For example, the standard deviation $\sigma_i$ is given by:

$$\sigma_i = \sqrt{2} \times \frac{L\Delta_i}{\varepsilon}$$

where L is the number of subsets contained in the plurality of subsets.

Adding Laplace noise to the sensitive data serves to guarantee that the algorithm proposed by the invention is $\varepsilon$-differentially private ($\varepsilon$-DP). In other words, in this implementation, the invention makes it possible to guarantee very strong privacy.

Nevertheless, the invention is not limited to adding noise by means of random Laplace variables. Thus, in a variant, it is possible to envisage adding noise by means of random Gaussian variables. Nevertheless, it should be observed that for a Gaussian noise distribution, the level of privacy that is guaranteed is lower than when using Laplace noise for all of the subsets of sensitive data. The differential privacy is then said to be of ($\varepsilon,\delta$) order (i.e. "($\varepsilon,\delta$)-differentially private"). By matching the mathematical definition of the sensitivity level to the intended noise distribution, it is nevertheless possible to achieve improvement in terms of accuracy (i.e. to reduce the error between the initial data and the anonymous data obtained at the end of the anonymization step).

In yet another variant, it is also possible to add noise having distributions that differ as a function of the sensitive data subsets under consideration. Thus, by way of example, it is possible to envisage adding a Laplace noise distribution to less sensitive data and a Gaussian noise distribution to more sensitive data. It is then necessary to investigate the level of privacy then made available by the selected combination, and particular care needs to be taken when selecting the standard deviations for the noise distributions used in such a configuration.

In a particular implementation, the noise levels applied to the sensitive data subsets resulting from the partitioning step are selected so as to minimize an error evaluated between the initial data and the anonymous data obtained at the end of the anonymization step.

This implementation tends to improve or even to optimize the performance of the anonymization algorithm proposed by the invention.

In similar manner, the partitioning of the sensitive data set that is applied during the partitioning step may be determined so as to minimize an error evaluated between the initial data and the anonymous data obtained at the end of the anonymization step.

In a particular implementation, the data taken into consideration in the invention, i.e. the initial data, the sensitive data with added noise, and/or the anonymous data obtained at the end of the anonymization step is stored in matrices.

Such a matrix representation is particularly advantageous for performing the invention, since it simplifies the processing performed on the above-mentioned data, which processing is then performed in the form of matrix processing.

Nevertheless, this assumption is not itself limiting and the invention applies equally well to other representations of data, such as for example graphs. It should be observed that it is easy to convert between a representation in graph form and a representation in matrix form.

In this particular implementation where the data manipulated by the invention is stored in matrix form, the anonymization step may advantageously further comprise decomposing the noisy sensitive data matrix into singular values and determining the anonymous data matrix on the basis of a determined number of singular values resulting from such decomposition.

The anonymization step as performed in this way includes adding noise to sensitive data as a function of its sensitivity level, and the singular value decomposition (SVD) of the data serves to further improve the quality of the anonymization provided by the invention. Specifically, less noise needs to be added in order to obtain the same level of privacy. This achieves an improvement in terms of the utility of the data.

In a variant implementation:
- during the partitioning step, the sensitivity level of a sensitive data value is defined as the maximum value, taken over all of the neighboring matrices of the initial data matrix, of the absolute value of the difference between that sensitive data value and the corresponding sensitive data value in the neighboring matrix under consideration, the neighboring matrix differing from the initial data matrix by the personal data of a single individual; and/or
- during the determination step, the sensitivity level of a sensitive data subset is defined as the maximum value, taken over all of the neighboring matrices of the initial data matrix, of the sum over all of the sensitive data of the subset of the absolute values of the difference between each sensitive data value and the corresponding sensitive data value in the neighboring matrix under consideration.

These definitions of sensitivity levels that rely on an $L_1$ norm (i.e. defined on the basis of a sum of the absolute values of differences) are particularly suitable when the noise under consideration during the anonymization step has a Laplace distribution (in particular because the definition of the Laplace distribution relies on an $L_1$ norm), and they make it possible to guarantee differential privacy. With other distributions, and in particular with a Gaussian distribution, it may be more advantageous to use some other norm for defining the sensitivities involved, e.g. such as an $L_2$ norm, as defined from the square root of a sum of squared absolute values of differences.

In a particular implementation, the various steps of the anonymization method are determined by computer program instructions.

Consequently, the invention also provides a computer program on a data medium or recording medium, the program being suitable for being performed in an anonymizer device or more generally in a computer, the program including instructions adapted to performing steps of an anonymization method as described above.

The program may use any programming language and be in the form of source code, object code, or code intermediate between source code and object code, such as in a partially compiled form, or in any other desirable form.

The invention also provides a computer readable data or recording medium including instructions of a computer program as mentioned above. The data or recording medium may be any entity or device capable of storing the program. For example, the medium may comprise storage means, such as a read only memory (ROM), e.g. a compact disk (CD) ROM or a microelectronic circuit ROM, or indeed magnetic recording means, e.g. a floppy disk or a hard disk.

Furthermore, the data or recording medium may be a transmissible medium such as an electrical or optical signal suitable for being conveyed via an electrical or optical cable, by radio, or by other means. The program of the invention may in particular be downloaded from an Internet type network.

Alternatively, the data or recording medium may be an integrated circuit in which the program is incorporated, the circuit being adapted to execute or to be used in the execution of the method in question.

The invention applies advantageously to any type of personal data about individuals that might be stored in a database of a computer system and that it is desired to anonymize, e.g. for the purpose of sharing or publishing the data. As described above, the invention applies in preferred manner to data that can easily be represented in the form of graphs or matrices, i.e. typically "dynamic" data representative of some particular activity of individuals.

Thus, in the light of the present context of expanding communications networks, the invention has a preferred but non-limiting application when the personal data comprises specifically data associated with the activity of a plurality of individuals on at least one network. The data in question may for example and in non-exhaustive manner be:
  mobility data acquired by a telephone operator (mobility traces between antenna sites of the network or other points of interest) or by any other actor who may track and store mobility of individuals in that operator's network (e.g. a rail network);
  data acquired from the Internet representative of individuals browsing various web sites and the transitions made between those sites;
  data acquired from social networks (social connection graph between the individuals);
  data representing the use of connected objects by individuals;
  etc.

The invention also provides a computer system comprising:
  a database storing "initial" data resulting from aggregating personal data relating to a plurality of individuals; and
  an anonymizer device of the invention for anonymizing the initial data.

The computer system benefits from the same above-mentioned advantages as the anonymization method and the anonymizer device.

In other embodiments and implementations, it is also possible to envisage that the anonymization method, the anonymizer device, and the computer system of the invention present in combination all or some of the above-mentioned characteristics.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF THE INVENTION

Figure 1:
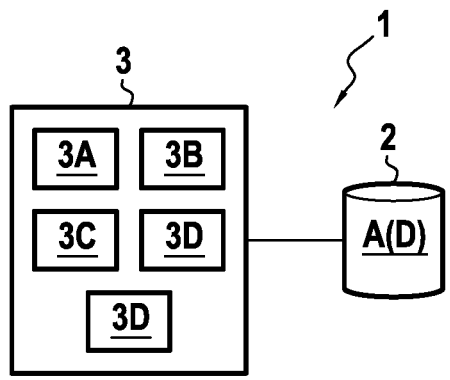
FIG. 1 is a diagram showing a computer system in accordance with the invention and in a particular embodiment.

FIG. 1 shows a particular embodiment of a computer system 1 in accordance with the invention and in its environment. In accordance with the invention, the computer system 1 is suitable for anonymizing, i.e. making anonymous, data D comprising personal data of a plurality of individuals I1, ..., IN, where N is any integer greater than 1.

Figure 2:
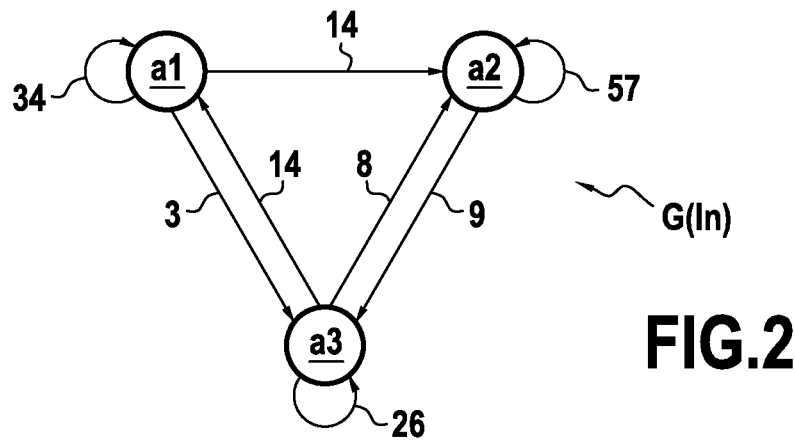
FIG. 2 is a representation in the form of a graph of an individual's personal data.

Although no limitation is associated with the nature of the personal data under consideration or with the manner in which it was acquired, it is assumed in this example by way of illustration that the personal data processed by the computer system 1 has been extracted from mobility traces identified in a mobile telecommunications network for a plurality of individuals I1, ..., IN. Such mobility traces are conventionally returned in call reports established by the network, and they represent the mobility of individuals while on communications set up over the mobile telecommunications network between the various antenna sites of the network, and relating to a given period of time. This mobility traces can easily be modeled for each individual In, $1 \leq n \leq N$, in the form of an individual connected graph G(In) as shown in FIG. 2, having K vertices (where K is an integer greater than 1) representing the antenna sites of the mobile network through which the communications set up over the network pass. Each edge of the graph of an individual between two vertices represents that individual making the transition between the antennas represented by these vertices during a communication. The weight associated with the edge represents the number of communications set up by that individual during a given period of observation (e.g. two weeks in this example) and during which a transition between those two antennas was detected by the network.

In the example shown in FIG. 2, during the two weeks under observation, the individual In under consideration set up a certain number of communications over the mobile network that pass via at least one of the K=3 antenna sites a1, a2, and a3 of the network. More precisely, 34 communications of the individual In were set up via the antenna site a1 alone, 57 via the antenna site a2, and 26 via the antenna site a3. For 14 communications, a transition was identified from antenna site a1 to antenna site a2. Furthermore:

8 communications made a transition from antenna site a3 to antenna site a2;
9 communications made a transition from antenna site a2 to antenna site a3;
7 communications made a transition from antenna site a3 to antenna site a1; and
3 communications made a transition from antenna site a1 to antenna site a3.

This example is naturally given purely by way of illustration.

It should be observed that such a graph, even though it takes account of all of the antenna sites of the mobile network (so K is potentially large), generally has low connectivity, since numerous transitions between antennas are never made by the individual.

The graph G(In) having K vertices may be represented in equivalent manner by an adjacency matrix of dimensions K×K, which is written herein: A(G(In)), where each coefficient Aij(G(In)) of the matrix, for i,j=1, . . . , K corresponds to the weight of the edge connecting the vertex of the graph having index $i$ to the vertex of the graph index $j$. In the example of the graph of FIG. 2, this adjacency matrix is a 3×3 matrix defined as follows:

$$A(G(In)) = \begin{bmatrix} 34 & 14 & 3 \\ 0 & 57 & 9 \\ 7 & 8 & 26 \end{bmatrix}$$

On the basis of the graphs or matrices for each individual I1, . . . , IN, it is possible to define a collective data graph or matrix that is obtained by aggregating the graphs (or matrices) of those various individuals. In this example, such aggregation consists in summing for each edge of the collective graph the weights of the corresponding edges of the graphs of the individuals. For the matrix representation, aggregating individual matrices amounts to summing the individual matrices. The collective graph as obtained in this way is written G and the corresponding collective data matrix is written A.

In a variant, functions other than summing could be envisaged for aggregating the individual data of the individuals I1, . . . , IN. For example, it is possible to take into consideration an average of the individual contributions made by each individual or a median of the transitions made by each individual on each edge of the graph.

In the description below, consideration is given to the matrix representation A of the data D obtained by aggregating the personal data relating to the individuals I1, . . . , IN. Nevertheless, this assumption is not itself limiting, and the invention applies in similar manner when some other data representation is used, e.g. in graph form.

The data D of the collective matrix A is stored in a database 2 of the computer system 1. This data constitutes "initial" data in the meaning of the invention, which data is to be anonymized by the computer system 1 in accordance with the invention.

Figure 3:
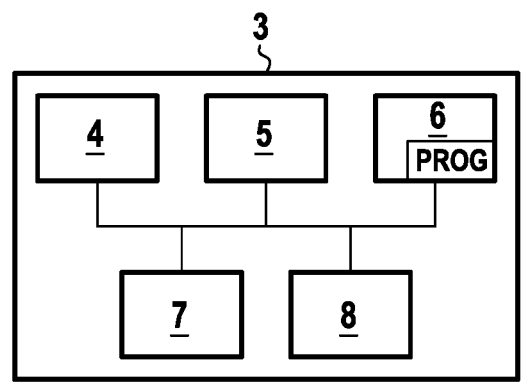
FIG. 3 is a diagram showing the hardware architecture of an anonymizer device of the invention, included in the FIG. 1 computer system.

For this purpose, the computer system 1 includes an anonymizer device 3 in accordance with the invention. In the presently-described embodiment, the anonymizer device 3 has the hardware architecture of a computer, as shown diagrammatically in FIG. 3.

It comprises in particular a processor 4, a random access memory (RAM) 5, a ROM 6, a non-volatile memory 7, and a communications module 8. The communications module 8 enables the anonymizer device 3 to communicate with the database 2, and in particular to access the data D for anonymizing that it contains. By way of example it may comprise a network card or any other means enabling it to connect to a communications network connecting the anonymizer device 3 to the database 2, or to communicate over a digital data bus connecting the anonymizer device 3 to the database.

In a variant, the database 2 may be stored directly in a memory of the anonymizer device 3, e.g. in its non-volatile memory 7.

The ROM 6 of the anonymizer device 3 constitutes a data medium in accordance with the invention that is readable by the processor 4 and that stores a computer program PROG in accordance with the invention, including instructions for executing steps of an anonymization method of the invention.

In equivalent manner, the computer program PROG defines functional and software modules as shown in FIG. 1 that are configured to perform the steps of the anonymization method of the invention. These functional modules rely on or control the hardware elements 4 to 8 of the above-described anonymizer device 3. In particular, in this example, they comprise:

an acquisition module 3A for acquiring initial data for anonymizing;
an identification module 3B configured to identify a sensitive data set within the initial data;
a partitioning module 3C configured to partition the sensitive data set as a plurality of subsets as a function of their sensitivity levels;
a determination module 3D configured to determine a sensitivity level for each subset; and
an anonymizer module 3E for anonymizing the initial data that is configured to add noise to the sensitive data of each subset with a level of noise that depends on the level of sensitivity determined for the subset.

The functions of these modules are described in greater detail below with reference to FIG. 4.

Figure 4:
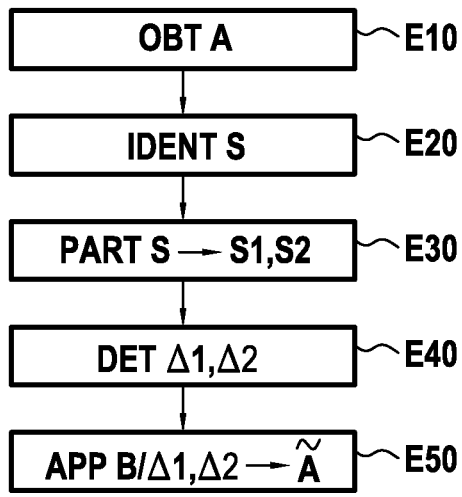
FIGS. 4 and 5 are flow charts showing the main steps of an anonymization method of the invention as performed by the anonymizer device of FIG. 3 in two particular implementations of the invention.

FIG. 4 shows the main steps of the anonymization method of the invention as they are performed in a first particular implementation by the anonymizer device 3 on the initial data D stored in matrix form A in the database 2 in order to generate anonymous data.

It is thus assumed initially that the anonymizer device 3 acts via its acquisition module 3A and its communication module 8 to obtain the initial data D stored in the form of a matrix A in the database 2 (step E10).

As mentioned above, the data matrix A is the result of aggregating the personal data of the individuals I1, . . . , IN. In other words, each coefficient Aij of the matrix A is the sum of the weights of the edges connecting the vertices i and j of the individual graph of each individual I1, . . . , IN, i.e. the sum of the coefficients Aij(In), for n=1, . . . , N of the individual matrices A(In) of the individuals I1, . . . , IN, i.e.:

$$Aij = \sum_{n=1}^{N} Aij(In)$$

for i,j=1, ..., K where K designates the number of vertices of each individual graph. In this example, the data matrix A is a real matrix. Thus, in the presently-envisaged example of mobility traces used for illustrative purposes:

- N designates the number of individuals (or clients of the mobile network) under consideration;
- K designates the number of antenna sites of the mobile network under consideration through which the communications of the individuals I1, ..., IN passed; each antenna has an index $i$, for i=1, ..., K;
- Aij(In) designates the number of communications (e.g. calls) made by the individual In that have transited from antenna $i$ to antenna $j$ over a period of two weeks; and
- Aij is the total number of communications made by the plurality of individuals I1, ..., IN that have transited from the antenna $i$ to the antenna $j$ over the period of two weeks.

In the description below, two real matrices A and A' of dimensions K×K are said to be "neighboring" and they are written A~A', whenever one of them is obtained from the other by adding or the removing personal data of a single individual (i.e. the weights of the edges in this example).

In accordance with the invention, the anonymizer device 3 acts via its identification module 3B to identify a data set written S of sensitive data within the initial data stored in the matrix A extracted from the database 2. The term "sensitive data" is used herein to mean the data of the matrix A that might be affected by personal data relating to one individual being added to or removed from the database. In the presently-described implementation, the sensitive data set S is given by:

$$S = \{(i,j) | Aij \neq Aij', \forall A \sim A'\}$$

It should be observed that the differential privacy depends solely on changes involving data about one individual being added to or removed from the database 2. Starting from the observation that coefficients that are not sensitive, i.e. for which Aij=Aij', are already anonymized (for example coefficients corresponding to zero weights in the collective graph, in other words for which no edge exists between the vertices $i$ and $j$, it is only coefficients that are sensitive that are anonymized in accordance with the invention.

In the presently-envisaged example of mobility traces, the non-sensitive coefficients may for example be the coefficients Aij for which there does not exist any individual who set up a communication that transited from the antenna $i$ to the antenna $j$. The edge (i,j) of the collective graph G is then not sensitive since its weight is zero independently of whether or not one or more particular individuals are present. Thus, in this example, the set S corresponds very nearly to the set of paths between the antenna $i$ and the antenna $j$ followed by at least one individual.

The anonymizer device 3 then acts via its partitioning module 3C to partition the set S of sensitive data into a plurality of subsets S1, S2, ..., SL, where L is an integer greater than 1, this partitioning being performed as a function of the level of sensitivity of the sensitive data (step E30). In the presently-described implementation, consideration is given to partitioning the set S into L=2 subsets S1 and S2.

More particularly, in the presently-described implementation, during this partitioning step E30, the partitioning module 3C acts for each coefficient Aij of the set S (i.e. for each sensitive data value in the set S), to evaluate its level of sensitivity, which is written Δij (referred to below for simplification purposes as "sensitivity") by using the following formula:

$$\Delta ij = \max_{A \sim A'} |Aij - Aij'|$$

Thereafter, in order to partition the sensitive data set S into two subsets S1 and S2, the partitioning module 3C compares the sensitivity Δij of each sensitive data value as indexed by the pair (i,j) of the set S relative to a predetermined threshold THR that is strictly positive. Data of sensitivity less than or equal to the threshold THR is classified in the subset S1, while the remaining sensitive data is classified in the subset S2, i.e.:

$$S1 = \{(i,j) \in S | \Delta ij \leq THR\}$$

$$S2 = \{(i,j) \in S | \Delta ij > THR\}$$

The partitioning module 3C thus obtains a partitioning P(THR)=(S1,S2) of the sensitive data set S, i.e. S is the union of the two disjoint sets S1 and S2.

Each subset S1 and S2 has its own sensitivity level Δ1 or Δ2, depending on the sensitive data it contains. The anonymizer device 3 acting via its determination module 3D then determines the sensitivity level for each subset S1 and S2 (step E40). In the presently-described implementation, this sensitivity level is calculated as follows:

$$\Delta 1 = \max_{A \sim A'} \sum_{(i,j) \in S1} |Aij - Aij'|$$

and $$\Delta 2 = \max_{A \sim A'} \sum_{(i,j) \in S2} |Aij - Aij'|$$

In other words, sensitivity is defined in this implementation by means of an $L_1$ norm. It should be recalled that the $L_1$ norm of a real vector, or more generally of a set of d real components, $v = (v_1, \ldots, v_d)$ is defined as:

$$|v|_1 = \sum_{i=1}^{d} |v_i|$$

Thus, in the presently-envisaged example of mobility traces, the more sensitive edges (i,j) that belong to the subset S2 may for example correspond to transitions between antennas $i$ and $j$ that correspond to an individual's home or work place (these antennas are used frequently). In contrast, the less sensitive edges belonging to the subset S1 may correspond to antenna sites situated in locations that individuals visit occasionally (e.g. an airport, a park, etc.).

It should be observed that the partitioning P(THR) depends on the threshold THR, which is determined beforehand. In the presently-described implementation, the threshold THR is selected so that the partitioning P(THR) minimizes (or almost minimizes) the error of the anonymization method, i.e. error between the initial data and the anonymous data obtained after anonymization. The expression for this error, which depends on the cardinal numbers of the subsets S1 and S2 and also on the sensitive levels Δ1 and Δ2, is given below.

In accordance with the invention, the anonymizer device 3 then anonymizes the sensitive data of the set S by adding noise at a level (i.e. an amplitude) that depends on the sensitivity of the data, and more particularly for which the level of the noise increases with increasing level of the sensitivity of the data (step E50).

For this purpose, in the presently-described implementation, the anonymizer module 3E of the anonymizer device 3 adds noise to the sensitive coefficients Aij of the matrix A (i.e. belonging to the set S), which noise has a Laplace distribution with standard deviation that varies (increases) as a function of the sensitivity of the subset to which the coefficients belong. It thus generates a noisy data matrix, written Ã, in which each coefficient, written Ãij is defined by:

$$Ãij = Aij + Bij$$

where:
Bij=0 if (i,j)∉S;
Bij follows a Laplace distribution having standard deviation:

$$\sigma 1 = \sqrt{2} \times \frac{2\Delta 1}{\varepsilon} \text{ if } (i,j) \in S1$$

Bij follows a Laplace distribution having standard deviation:

$$\sigma 2 = \sqrt{2} \times \frac{2\Delta 2}{\varepsilon} \text{ if } (i,j) \in S2;$$

ε is a measure of the level of anonymity guaranteed by the algorithm.

When the set S is partitioned into L subsets S1, . . . , SL, with L>2 (by previously providing L−1 thresholds), the anonymizer module 3E adds noise Bij to each coefficient Aij of the matrix A that is defined as follows:
Bij=0 if (i,j)∉S;
Bij follows a Laplace distribution of standard deviation:

$$\sigma l = \sqrt{2} \times \frac{L\Delta l}{\varepsilon} \text{ if } (i,j) \in Sl;$$

where Δl designates the sensitivity level of the subset S1, 1≤l≤L, and ε designates a measure of the level of anonymity guaranteed by the anonymization performed.

The data (i.e. the coefficients) of the matrix Ã resulting from applying random Laplace noise as defined in this way to the sensitive data of the matrix A thus constitutes anonymous data. Advantageously, this data presents better quality than the data obtained using the anonymization algorithm of Dwork et al. as described in document D2 and in which noise of uniform amplitude is applied to all of the data of the matrix.

Furthermore, the inventors consider that if it is assumed that an individual may act in the matrix A on at most m coefficients of the matrix, then the following relationships exists: Δ1≤m×THR.

Thus, if m and THR are small enough, the sensitivity level Δ1 is negligible relative to the sensitivity level Δ considered in the anonymization algorithm of Dwork et al. for calibrating the noise to be applied to the data. The more data there is in S1 and the smaller Δ1 (i.e. the greater the amount of data of low sensitivity in the matrix A), the better the performance that is obtained by means of the invention in comparison with the anonymization algorithm of Dwork et al.

In another implementation, the noise levels applied to the sensitive data subsets S1 and S2 are selected so as to minimize error as evaluated between the initial data of the matrix A and the anonymous data of the matrix Ã as obtained at the end of the anonymization performed in step E50. For example, if this error, written ERR, is defined mathematically from an $L_1$ norm as follows:

$$ERR = E[|Ã-A|]$$

where E[.] is mathematical expectation, it can easily be shown that this error ERR can also be expressed in the form:

$$ERR = f(n1, n2, \Delta 1, \Delta 2) = \frac{\sqrt{2}}{\varepsilon} \times \left(\sqrt{n1\Delta 1} + \sqrt{n2\Delta 2}\right)$$

where n1 and n2 designate the numbers of sensitive data values in the sets S1 and S2, respectively. It should be observed that an $L_1$ norm is particularly suitable and is easier to interpret when using Laplacian noise, since it relies on the same mathematical operations as those used for defining the sensitivity of each subset and for calibrating the noise. Nevertheless, in a variant, other error definitions could be considered, e.g. an error that is mathematically defined from an $L_2$ norm. It should be recalled that the $L_2$ norm of a real vector, or more generally of a set of d real components $v=(v_1, \ldots, v_d)$ is defined as follows:

$$|v|_2 = \sqrt{\sum_{i=1}^{d} |v_i|^2}$$

Minimizing the error ERR serves to determine "optimized" noise standard deviations suitable for applying to the data of the subsets S1 and S2 during the anonymization step E50, and more precisely:

$$\sigma 1 = \sqrt{2} \times \frac{\Delta 1}{\varepsilon} \times \frac{\sqrt{n1\Delta 1} + \sqrt{n2\Delta 2}}{\sqrt{n1\Delta 1}}$$

and $$\sigma 2 = \sqrt{2} \times \frac{\Delta 2}{\varepsilon} \times \frac{\sqrt{n1\Delta 1} + \sqrt{n2\Delta 2}}{\sqrt{n2\Delta 2}}$$

The expression for the error ERR, and the way it is minimized, also serves to determine the threshold THR as used for partitioning the set S into two subsets S1 and S2, as mentioned above. For this purpose, it is possible to proceed by trial and error by considering a plurality of threshold values THR1, THR2, . . . lying in the range 0 and a general sensitivity level Δ evaluated on all of the sensitive data of the matrix A (e.g. as in the state of the art and in the algorithm of document D2), and by considering the resulting partitions PART1, PART2, . . . for each of these values. Thereafter, for each of these partitions PARTj, j=1, 2, . . . , the corresponding error ERRj is calculated using the formula given above. The threshold THR and the partitioning PART that are used are those that lead to the minimum error ERRj.

The noisy data matrix Ã obtained at the end of the step E50 of adding noise is a matrix of data that is anonymous in the meaning of the invention. It guarantees a level of anonymity for the data, and one measure of that anonymity is given by the parameter ε. The anonymization method of the invention constituted by steps E10 to E50 is thus a random preferred (ε-DP) differential privacy algorithm ALG. The term "random algorithm" is used to mean an algorithm ALG that outputs a random matrix in application of a probability law that depends on the initial matrix supplied as input to the algorithm.

As mentioned above, this means that for all neighboring real matrix A~A', A and A' being of dimensions K×K, the following applies:

$$\frac{P(ALG(A) = M)}{P(ALG(A') = M)} \le e^{\varepsilon}$$

for any real matrix M of dimension K×K, where P(E) is the probability of a collection of events E.

In other words, two results from the algorithms ALG(A) and ALG(A') have almost the same probability law if the inputs of the algorithms A and A' are neighboring matrices. The term "almost" is quantified by the parameter ε: the smaller this parameter, the closer the laws and the greater the difficulty of detecting any particular individual in the matrix ALG(A). Nevertheless, the smaller this parameter, the more the quality of the matrix ALG(A) is also degraded, i.e. the greater the departure of the matrix ALG(A) from the initial matrix A, and the greater the loss of useful information about the data A. The anonymization algorithm of the invention is a ε-DP algorithm like the algorithm described by Dwork et al. in document D2, but it enables better quality anonymous data to be obtained (limited loss of information).

Figure 5:
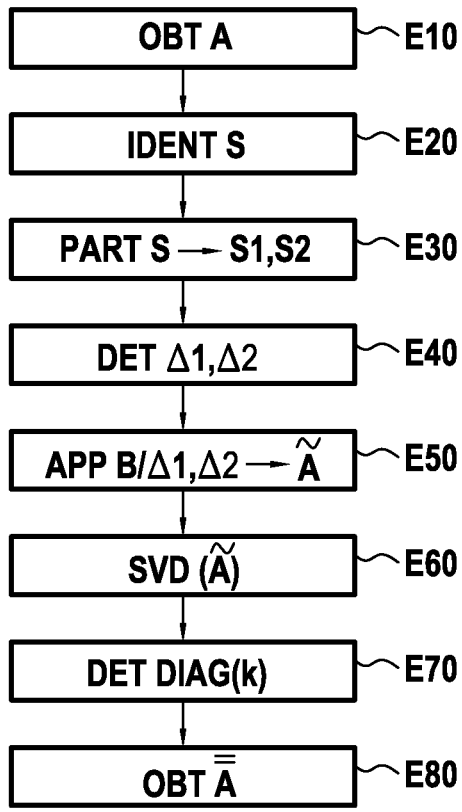

FIG. 5 shows the second implementation of the invention, in which the anonymizer module 3E of the anonymizer device 3 applies additional processing to the matrix A after step E50 in order to anonymize its data.

In this second implementation, steps E10 to E50 as described above with reference to FIG. 4 and the first implementation are applied to the matrix A by the anonymizer device, thereby giving rise to the noisy sensitive data matrix Ã.

Step E50 is then followed by the anonymizer module 3E decomposing the noisy sensitive data matrix Ã into singular values (step E60). Such singular value decomposition (SVD) is known to the person skilled in the art and is not described in greater detail herein. By way of example, it may be performed using the known algorithm referred to as the "power method".

Such singular value decomposition (SVD) leads to three matrices U, V, and DIAG being determined such that:

$$\tilde{A} = U \cdot DIAG \cdot V$$

where U and V are orthogonal matrices of dimensions K×K and DIAG is a diagonal matrix, made up of singular values $\lambda L, \ldots, \lambda K$ of the matrix A organized in this example in decreasing order $\lambda L \ge \lambda L \ge \ldots \ge \lambda K$, i.e.:

$$DIAG = \begin{bmatrix} \lambda 1 & 0 & \ldots & & & 0 \\ & \lambda 2 & & & & \\ & & 0 & \ldots & 0 & \ldots \\ & & & \lambda k & & \\ & & & & 0 & \ldots \\ 0 & \ldots & & & & \ldots \\ 0 & & & & & \lambda K \end{bmatrix}$$

Thereafter, the anonymizer module 3E uses the diagonal matrix DIAG to determine a new diagonal matrix DIAG(k) that is of rank k, where k is a predetermined integer such that 1≤k≤K (step E70). This matrix DIAG(k) has the k largest singular values of the matrix DIAG along its diagonal and its other coefficients are zero, i.e.:

$$DIAG(k) = \begin{bmatrix} \lambda 1 & 0 & \ldots & & & 0 \\ & \lambda 2 & & & & \\ & & 0 & \ldots & 0 & \ldots \\ & & & \lambda k & & \\ & & & & 0 & 0 \\ 0 & \ldots & & & & \ldots \\ 0 & & & & & 0 \end{bmatrix}$$

The resulting matrix DIAG(k) is an approximation to the matrix DIAG, that is "simpler" than the matrix DIAG in that it has fewer values on its diagonal, even though it contains most of the information contained in the matrix DIAG (since it has the higher value singular values, in other words its principal components). Thus, although anonymizing the data leads to information being lost, in this example this loss is moderate and is particularly well controlled.

Thereafter, the matrix DIAG(k) is used for the anonymizer module 3E to construct an anonymous data matrix written Ã, using the following equation (step E80):

$$\tilde{A} = U \cdot DIAG(k) \cdot V$$

It should be observed that the anonymization algorithm proposed in this second implementation is likewise an ε-DP algorithm. The inventors have observed that this algorithm gives better results (i.e. anonymous data of better quality) even than the algorithm described with reference to FIG. 4 (i.e. without SVD). It should also be observed that this algorithm also gives better results than the algorithm of Dwork et al. as described in document D2, even after applying SVD type decomposition thereto.

In the two implementations described herein, the initial data D of the database 2 is anonymized by adding noise having a Laplace distribution to the data that is considered to be sensitive. Nevertheless, this assumption is not itself limiting, and other noise distributions could be envisaged, such as for example a Gaussian distribution having its standard deviation adjusted as a function of the sensitivity of the data. It is also possible to envisage adding noise to data in the different subsets using noise that is distributed using different laws (e.g. adding Gaussian noise to the more sensitive data and Laplacian noise to the less sensitive data). Nevertheless, it should be observed that using distributions other than the Laplace distribution can give rise to a lower level of privacy. It is then appropriate to speak of differential privacy of (ε,δ)-DP type.

Furthermore, in both implementations described herein, consideration is given to sensitivities defined using $L_1$ norms (absolute value of a difference between two coefficients). This definition is particularly well adapted to Laplacian noise and to the definitions envisaged for sensitivity levels in those two implementations. It also makes it possible to guarantee an anonymization algorithm that is ε-DP. Specifically, the inventors have found that with Laplacian noise, the sensitivity levels defined using the $L_1$ norm and used in the two implementations shown in FIGS. 4 and 5 have the quantities that need to be under control in order to be able to guarantee differential privacy formally.

Nevertheless, in a variant, other definitions of the sensitivity level of each data value and of each subset could be envisaged, e.g. definitions based on an $L_2$ norm. It is thus possible to envisage the following definitions for sensitivity levels of the subsets S1 and S2:

$$\Delta 1^{L_2} = \max_{A-A'} \sqrt{\sum_{(i,j) \in S1} |Aij - Aij'|^2}$$

$$\Delta 2^{L_2} = \max_{A-A'} \sqrt{\sum_{(i,j) \in S2} |Aij - Aij'|^2}$$

The use of sensitivity levels defined in this way on the basis of an $L_2$ norm should be accompanied by a suitable modification to the standard deviations σ1 and σ2 for the noise that is added during step E50 in order to guarantee differential privacy.

The use of an $L_2$ norm for defining sensitivity levels is particularly well adapted when Gaussian noise is envisaged for anonymizing the data. Although the use of Gaussian noise instead of Laplacian noise leads to a lower level of privacy ((ε,δ) privacy instead of ε privacy), it should be observed that better accuracy can be achieved by combining Gaussian noise with sensitivity levels defined using an $L_2$ norm as proposed above. Specifically, the $L_2$ norm of a vector is known to be smaller than the $L_1$ norm of the same vector, so the error evaluated between the anonymized matrix and the initial matrix is smaller.

Thus, in the example of partitioning the sensitive data set S into two subsets S1 and S2 having respective sensitivity levels $\Delta 1^{L_2}$ and $\Delta 2^{L_2}$ that are defined using the $L_2$ norm as mentioned above, it is possible to envisage obtaining a (ε,δ)-DP anonymization method for adding noise to the sensitive data of the sets S1 and S2 by using Gaussian noise with standard deviations σ1 and σ2 respectively as follows:

$$\sigma 1 = \frac{\Delta 1^{L_2} \times \alpha \times (\sqrt{\mu_1} + \sqrt{\mu_2})}{\varepsilon \sqrt{\mu_1}}$$

$$\sigma 2 = \frac{\Delta 2^{L_2} \times \alpha \times (\sqrt{\mu_1} + \sqrt{\mu_2})}{\varepsilon \sqrt{\mu_2}}$$

with:

$$\alpha = \sqrt{2\ln\left(\frac{1.25}{\delta}\right)}$$

$$\mu_1 = n_1 \times \Delta 1^{L_2} \times \alpha$$

$$\mu_2 = n_2 \times \Delta 2^{L_2} \times \alpha$$

where $n_1$ designates the number of sensitive data values contained in the set S1 and $n_2$ designates the number of sensitive data values contained in the set S2. These standard deviations advantageously serve to minimize the error ERR=E[|Ã−A|] defined by the $L_1$ norm between the initial data matrix and the anonymous data matrix.

The invention is illustrated herein on the basis of an example data matrix A derived from a call graph from a plurality of individuals I1, . . . , IN. As mentioned above, this example is given purely by way of illustration, and the invention applies to many kinds of personal data other than this type of data, providing it can be stored in a database of a computer system. It also applies in preferential manner to data that can be represented in the form of graphs or matrices (it being easy to derive an adjacency matrix from a graph), such as "dynamic" data. By way of example, such dynamic data may be data associated with the activity of individuals on one or more networks such as a mobile telephone network, a fixed telephone network, the public Internet, a network of connected objects, etc.

Thus, as examples, the personal data of individuals under consideration may be:

data representative of Internet user browsing history: the vertices of the graph G(In) of an individual In would then be the addresses of web sites or uniform resource locators (URLs) visited by that individual over a predetermined time period, and the weight of each edge (i,j) would correspond to the number of transitions made by that individual from URL i to URL j during the time period under consideration;

data representative of the activity of individuals on a social network: the graph G(In) of an individual In would then be a social graph representing the connections of that individual, and the weight of each edge (i,j) would correspond to the number of transitions made by that individual from a person i of the network to a person j; and data representative of the activity of individuals on a network of connected objects: each vertex of the graph G(In) of an individual In would represent a type of connected object (e.g. a watch, a coffee pot, etc.), and the weight of each edge (i,j) would correspond to the number of moves by the individual from a connected object i to a connected object j, in other words the number of times the individual i uses the connected object j after using the connected object i.

By means of the anonymization method of the invention, the personal data as acquired in this way about the individuals I1, . . . , IN can be published (in approved and anonymized form) without any risk of disclosing information about one individual in particular.

The invention claimed is:

1. An anonymization method comprising:
anonymizing initial data stored in a database of a computer system, said initial data resulting from aggregating personal data relating to a plurality of individuals, the anonymizing being performed by the computer system and comprising:
identifying in the initial data a set of sensitive data, the sensitive data being data that would be affected by personal data relating to an individual being added to or removed from the database;
partitioning the sensitive data set into a plurality of subsets based on sensitivity of the sensitive data;
determining a respective sensitivity level for each subset; and
adding noise to the sensitive data of each subset, the added noise having a level that depends on the respective sensitivity level determined for said each subset, wherein the anonymization of the initial data renders it impossible to target or to infer information about one of the plurality of individuals using the anonymized initial data, and to know whether the anonymized initial data is associated with one of the plurality of individuals.

2. The anonymization method according to claim 1, wherein the level of the noise added to the sensitive data of a subset increases with increasing sensitivity level of the subset.

3. The anonymization method according to claim 1, wherein the partitioning of the sensitive data set is configured to minimize an error evaluated between the initial data and anonymous data obtained at the end of the anonymization.

4. The anonymization method according to claim 1, wherein adding noise to the sensitive data of a subset indexed by i comprises adding to that sensitive data noise having a Laplace distribution with a standard deviation $\sigma_i$ that is defined from the sensitivity level $\Delta_i$ determined for the subset and from a measure c of an anonymity level of the anonymization of the initial data.

5. The anonymization method according to claim 4, wherein the standard deviation $\sigma_i$ is given by:

$$\sigma_i = \sqrt{2} \times \frac{L\Delta_i}{\varepsilon}$$

where L is the number of subsets contained in the plurality of subsets.

6. The anonymization method according to claim 1, wherein adding noise to the sensitive data of a subset indexed by i comprises adding to that sensitive data noise having a Gaussian distribution.

7. The anonymization method according to claim 1, wherein the level of the noise added to the sensitive data of said each subset is selected so as to minimize an error evaluated between the initial data and anonymous data obtained at the end of the anonymization.

8. The anonymization method according to claim 1, wherein the initial data is stored in an initial data matrix and the sensitive data to which noise is added is stored in a sensitive data matrix.

9. The anonymization method according to claim 8, further comprising decomposing the sensitive data matrix into singular values and determining an anonymous data matrix on the basis of a determined number of singular values resulting from such decomposition.

10. The anonymization method according to claim 8, wherein:
during said partitioning, the sensitivity level of a sensitive data value is defined as the maximum value, taken over all of the neighboring matrices of the initial data matrix, of the absolute value of the difference between that sensitive data value and the corresponding sensitive data value in the neighboring matrix under consideration, the neighboring matrix differing from the initial data matrix by the personal data of a single individual; and/or
during said determining, the sensitivity level of a sensitive data subset is defined as the maximum value, taken over all of the neighboring matrices of the initial data matrix, of the sum over all of the sensitive data of the subset of the absolute values of the difference between each sensitive data value and the corresponding sensitive data value in the neighboring matrix under consideration.

11. The anonymization method according to claim 1, wherein the initial data is stored in the database in the form of a graph.

12. The anonymization method according to claim 1, wherein the personal data of a plurality of individuals comprises data associated with activity of those individuals on at least one network.

13. A non-transitory computer readable data medium storing a computer program including instructions for executing an anonymization method when the instructions are executed by a processor, wherein the method comprises:
anonymizing initial data stored in a database of a computer system, said initial data resulting from aggregating personal data relating to a plurality of individuals, the anonymizing comprising:
identifying in the initial data a set of sensitive data, the sensitive data being data that would be affected by personal data relating to an individual being added to or removed from the database;
partitioning the sensitive data set into a plurality of subsets based on sensitivity of the sensitive data;
determining a respective sensitivity level for each subset; and
adding noise to the sensitive data of each subset, the added noise having a level that depends on the respective sensitivity level of the subset,
wherein the anonymization of the initial data renders it impossible to target or to infer information about one of the plurality of individuals using the anonymized initial data, and to know whether the anonymized initial data is associated with one of the plurality of individuals.

14. An apparatus comprising:
an anonymizer device for anonymizing initial data stored in a database, the initial data resulting from aggregating personal data relating to a plurality of individuals, the anonymizer device comprising:
a processor; and
a non-transitory computer readable data medium comprising a computer program stored thereon including instructions, which when executed by the processor configure the anonymizing device to:
identify in the initial data a set of sensitive data, the sensitive data being data that would be affected by personal data relating to an individual being added to or removed from the database;
partition the sensitive data set into a plurality of subsets based on sensitivity of the sensitive data;
determine a respective sensitivity level for each subset; and
add noise to the sensitive data of each subset, the added noise having a level that depends on the respective sensitivity level determined for said each subset,
wherein the anon ymization of the initial data renders it impossible to target or to infer information about one of the plurality of individuals usin. the anonymized initial data, and to know whether the anonymized initial data. is associated with one of the plurality of individuals.

15. The apparatus according to claim 14, comprising:
a database storing the initial data resulting from aggregating personal data relating to the plurality of individuals.

* * * * *